(12) United States Patent
Anderson et al.

(10) Patent No.: US 7,268,170 B2
(45) Date of Patent: Sep. 11, 2007

(54) FOAM MODIFIER, FOAMS PREPARED FROM THIS NOVEL FOAM MODIFIER AND A PROCESS FOR THE PREPARATION OF THESE FOAMS

(75) Inventors: Nathan L. Anderson, Charleston, WV (US); Veril C. Jividen, Scott Depot, WV (US); Stanley L. Hager, Cross Lanes, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 0 days.

(21) Appl. No.: 10/964,367

(22) Filed: Oct. 13, 2004

(65) Prior Publication Data

US 2006/0079591 A1    Apr. 13, 2006

(51) Int. Cl.
*C08G 18/28* (2006.01)
(52) U.S. Cl. .................. 521/176; 521/170; 521/174
(58) Field of Classification Search ................ 521/174, 521/170, 176
See application file for complete search history.

(56) References Cited

U.S. PATENT DOCUMENTS

| | | | |
|---|---|---|---|
| 3,993,576 A | 11/1976 | Barron | |
| 4,385,133 A | 5/1983 | Alberino et al. | 521/159 |
| 4,863,976 A | 9/1989 | Nichols et al. | 521/137 |
| 4,929,646 A | 5/1990 | Nichols et al. | 521/137 |
| 4,950,694 A | 8/1990 | Hager | 521/167 |
| 5,179,132 A | 1/1993 | Mizuno et al. | 521/174 |
| 5,420,170 A | 5/1995 | Lutter et al. | 521/159 |
| 5,464,560 A * | 11/1995 | Schilling et al. | 252/182.24 |
| 6,586,486 B2 * | 7/2003 | Falke et al. | 521/124 |

* cited by examiner

*Primary Examiner*—John M. Cooney, Jr.
(74) *Attorney, Agent, or Firm*—Lyndanne M. Whalen; N. Denise Brown

(57) ABSTRACT

This invention relates to novel foam modifiers which can be used to prepare flexible foams. These novel foam modifiers provide improved processability and improved properties of the resultant flexible foams. The present invention also relates to the process of preparing these flexible foams and to the resultant foams.

20 Claims, No Drawings

US 7,268,170 B2

FOAM MODIFIER, FOAMS PREPARED FROM THIS NOVEL FOAM MODIFIER AND A PROCESS FOR THE PREPARATION OF THESE FOAMS

BACKGROUND OF THE INVENTION

This invention relates to novel foam modifiers which can be used to prepare flexible foams. These novel foam modifiers provide improved processability and improved properties of the resultant flexible foams. The present invention also relates to the process of preparing these flexible foams and to the resultant foams.

Slabstock foam facilities today need to efficiently produce quality foams of widely varying types, grades and performance characteristics. For a single facility to have this diversity in production, it is typically necessary to use several different polyols, surfactants, catalysts, processing aids, special additives and polyisocyanates. Obviously, each different component requires a separate storage and delivery system, which results in increased equipment cost and complexity. It also increases the possibility of cross contamination between components and of formulating errors.

The preparation of various types and grades of flexible polyurethane foams is often improved or made easier when the isocyanate-reactive mixture comprises minor levels of one or more low molecular weight extenders, crosslinkers or compatibilizers and minor levels of one or more high molecular weight polyols. These constituents can have a favorable effect on foam processing, but often have a detrimental effect on certain foam properties such as reduced porosity and increased compression sets. The reduction in foam porosity becomes particularly disadvantageous for flexible slabstock foams made at isocyanate indexes near 100 and above. A single modifier blend offering improvements in the production and properties of various types and grades of slabstock foam would be a valued addition to the industry.

Compositions containing high and low MW polyols that are resistant to phase separation are known and described in U.S. Pat. No. 3,993,576. These compositions comprise (A) an insoluble mixture that is susceptible to phase separation which comprises (1) from about 50 to about 95% by weight of a high molecular weight polyol, and (2) from about 5 to about 50% by weight of a low molecular weight polyol; and (B) a solubilizer for (A) which corresponds to one of two formulas, that is present in a small but effective quantity such that the entire composition is phase stable. The high molecular weight polyols suitable are those wherein a majority of the oxyalkylene groups are not oxyethylene groups. The solubilizer comprises propylene glycol derivatives and/or butylene glycol derivatives.

U.S. Pat. No. 4,385,133 describes a specific combination of polyols and an extender which results in a homogeneous, single phase blend of the polyols and extender. In particular, the polyol component is a mixture comprising (a) a polyoxypropylene polyoxyethylene polyol having an average functionality of from 2 to 4, a molecular weight of about 3,000 to about 10,000 and containing at least 23% by weight of ethylene oxide residues, and (b) a polyoxypropylene polyoxyethylene polyol having an average functionality of from 2 to 4, a molecular weight of about 750 to about 2,000 and containing at least 45% of ethylene oxide. The proportions by weight of (a) and (b) are adjusted such that the aliphatic glycol extender is completely miscible. This combination is disclosed as being useful for the preparation of polyurethanes, particularly when using a RIM (reaction injection molding) process.

Foam processing aids for the production of conventional polyurethane slabstock foam at low isocyanate indices using the free-rise process are described in U.S. Pat. No. 4,950, 694. The foam processing aids assist in avoiding/preventing foam splitting without destroying the open cell structure and high porosity characteristic of conventional, flexible polyurethane foam, and particularly soft, low density foam. These foam processing aids comprise at least one crosslinking/extending agent, and possibly a cell opening agent which is preferably a polyethylene oxide monol and/or polyol. Suitable crosslinking/extending agents have equivalents weights of less than about 200, and suitable monols and polyols for the processing aid have ethylene oxide contents of greater than 50% by weight.

U.S. Pat. Nos. 4,863,976 and 4,929,646 disclose flexible polyurethane foams, a method for making these flexible polyurethane foams and suitable active hydrogen containing compositions. These flexible foams comprise (a) at least one relatively high MW polyester polyol or polyether polyol containing at least 50 wt. % of oxypropylene units, an amine-terminated derivative of such polyester or polyether polyol or mixture thereof, (b) an effective amount of a blowing agent, (c) a high functionality polyether polyol based on an initiator or initiator mixture having at least about 4.0 active hydrogens per molecule, and a molecular weight of at least about 5000 and containing at least about 50 wt. % of oxyethylene units and sufficient oxypropylene units to render it compatible with component (a) at the relative proportions thereof present in the reaction mixture, in an amount sufficient to provide a measurable increase in the proportion of open cells in the foam as compared with a similar foam prepared in the absence of high functionality polyether polyol, and (d) at least one polyisocyanate.

There is a need for a single additive polyol that would be capable of improving the processing and grade latitude of various types of flexible slabstock foams and which would avoid losses in foam properties such as reduced porosity and increased compression sets. A single additive polyol could improve production efficiency by avoiding the need to store and deliver multiple components during the slabstock foam process. The present invention provides a foam modifier for the efficient production of flexible slabstock foams.

SUMMARY OF THE INVENTION

This invention relates to a novel foam modifier, to a process for the production of flexible polyurethane foams using this foam modifier, and to the resultant flexible polyurethane foams.

In the process for the preparation of a flexible polyurethane foam having a density of less than or equal to 8 pcf, the process comprises (I) reacting (1) an aromatic polyisocyanate component having a functionality of at least about 2.0;

(2) from about 90 to about 99.8 parts, preferably from about 95 to about 99.7 parts by weight, based on 100 parts by weight of (2) and (3), of an isocyanate-reactive component comprising one or more polyoxyalkylene polyether polyols having from 2 to 8 hydroxyl groups, an OH number of about 11 to about 280, and containing less than 30% by weight of copolymerized oxyethylene (based on 100% by weight of oxalkylene); and (3) from about 0.2 to about 10 parts, preferably from about 0.3 to about 5 parts by weight, based on 100 parts by weight of components (2) and (3), of a foam modifier comprising
  (a) from about 35 to about 80% by weight, preferably from about 40 to about 65% by weight, based on 100% by weight of component (3), of at least one low molecular weight component selected from the group consisting of 1,3-propanediol, 1,3-butanediol, 1,4-butanediol and mixtures thereof, and
  (b) from about 20 to about 65, preferably from about 35 to about 60% by weight, based on 100% by weight of component (3), of one or more polyether polyols having from 2 to 8 hydroxyl groups, an OH number of from about 11 to about 280 and containing greater than about 50% by weight of copolymerized oxyethylene (based on 100% by weight of the oxyalkylene content); in the presence of
(4) one or more blowing agents;
(5) one or more catalysts; and
(6) one or more surfactants.

The Isocyanate index for this system, based on the quantity of all isocyanate components and all isocyanate-reactive components present, is at least 98, and preferably from about 100 to about 120.

In a variation of the process of making flexible foams, the foam modifier (3) may comprise:
(a) from about 35% to about 75%, preferably from about 40% to about 60%, and more preferably from greater than about 50% to about 60% by weight, based on 100% by weight of the composition, of one or more compounds selected from the group consisting of 1,3-propanediol, 1,3-butanediol, 1,4-butanediol and mixtures thereof;
(b) from about 20% to about 60%, preferably from about 30% to about 50% by weight, based on 100% by weight of the composition, of one or more polyether polyols containing from 2 to 8 hydroxyl groups per molecule, having an OH number of from about 11 to about 280 and containing greater than 50% by weight, based on 100% by weight of oxyalkylene, of copolymerized oxyethylene; and
(c) from 5% to 25%, preferably from 10% to 20% by weight, based on 100% by weight of the composition, of dipropylene glycol.

Another aspect of the present invention is directed to the resultant polyurethane flexible foam which has a density of less than or equal to 8 pcf. These flexible foams comprise the reaction product of
(1) an aromatic polyisocyanate component having a functionality of at least about 2.0;
(2) from about 90 to about 99.8, preferably from about 95 to about 99.7 parts by weight, based on 100 parts by weight of (2) and (3), of an isocyanate-reactive component comprising one or more polyoxyalkylene polyether polyols having from 2 to 8 hydroxyl groups, an OH number of about 11 to about 280, and containing less than 30% by weight of copolymerized oxyethylene (based on 100% by weight of oxyalkylene); and
(3) from about 0.2 to about 10, preferably from about 0.3 to about 5 parts by weight, based on 100 parts by weight of components (2) and (3), of a foam modifier comprising
  (a) from about 35 to about 80% by weight, preferably from about 40 to about 65% by weight, based on 100% by weight of component (3), of at least one low molecular weight component selected from the group consisting of 1,3-propanediol, 1,3-butanediol, 1,4-butanediol and mixtures thereof, and
  (b) from about 20 to about 65%, preferably from about 35 to about 60% by weight, based on 100% by weight of component (3), of one or more polyether polyols having from 2 to 8 hydroxyl groups, an OH number of from about 11 to about 280 and containing greater than about 50% by weight of copolymerized oxyethylene (based on 100% by weight of the oxyalkylene content);

in the presence of
(4) one or more blowing agents;
(5) one or more catalysts; and
(6) one or more surfactants.

The Isocyanate index of these foams, based on the quantity of all isocyanate containing components and all isocyanate reactive components present, is at least 98, and preferably from about 100 to about 120

In a variation of flexible foams of the invention, the foam modifier (3) may comprise:
(a) from about 35% to about 75%, preferably from about 40% to about 60%, and more preferably from greater than about 50% to about 60% by weight, based on 100% by weight of the composition, of one or more compounds selected from the group consisting of 1,3-propanediol, 1,3-butanediol, 1,4-butanediol and mixtures thereof;
(b) from about 20% to about 60%, preferably from about 30% to about 50% by weight, based on 100% by weight of the composition, of one or more polyether polyols containing from 2 to 8 hydroxyl groups per molecule, having an OH number of from about 11 to about 280 and containing greater than 50% by weight, based on 100% by weight of oxyalkylene, of copolymerized oxyethylene; and
(c) from 5% to 25%, preferably from 10% to 20% by weight, based on 100% by weight of the composition, of dipropylene glycol.

In accordance with the present invention, the novel foam modifiers comprise:
(a) from about 35% to about 75%, preferably from about 40% to about 60%, and more preferably from greater than about 50% to about 60% by weight, based on 100% by weight of the composition, of one or more compounds selected from the group consisting of 1,3-propanediol, 1,3-butanediol and 1,4-butanediol;
(b) from about 20% to about 60%, preferably from about 30% to about 50% by weight, based on 100% by weight of the composition, of one or more polyether polyols containing from 2 to 8 hydroxyl groups per molecule, having an OH number of from about 11 to about 280 and containing greater than 50% by weight, based on 100% by weight of oxyalkylene, of copolymerized oxyethylene; and
(c) from 5% to 25%, preferably from 10% to 20% by weight, based on 100% by weight of the composition, of dipropylene glycol.

DETAILED DESCRIPTION OF THE INVENTION

In the flexible polyurethane foams and the process of making the flexible foams of the present invention, the resultant flexible foams generally have a density of less than or equal to 8 pcf, and preferably less than or equal to 6 pcf.

The polyurethane foams comprise the reaction product of (1) an aromatic polyisocyanate component, (2) an isocyanate-reactive component comprising one or more polyoxyalkylene polyether polyols, and (3) a foam modifier, in the presence of (4) one or more blowing agents, (5) one or more catalysts, and (6) one or more surfactants. The relative amounts of NCO groups is such that the Isocyanate Index is at least equal to 98, and preferably at least about 100 of the stoicheometric amount necessary to react with the isocyanate reactive groups in the overall foam formulation. It is also preferred that the Isocyanate Index is less than or equal to about 120.

Suitable compositions to be used as foam modifiers (3) herein comprise (a) at least one low molecular weight component selected from the group consisting of 1,3-propanediol, 1,3-butanediol, 1,4-butanediol and mixtures thereof, and (b) one or more polyether polyols having from 2 to 8 hydroxyl groups, an OH number of from about 11 to about 280 and containing greater than about 50% by weight of copolymerized oxyethylene (based on 100% by weight of the oxyalkylene content).

In an alternate embodiment of the invention, the foam modifiers (3) additionally comprise (c) dipropylene glycol.

Suitable polyisocyanate components to be used as component (1) of the flexible foams of the invention include, for example, aromatic polyisocyanates characterized by a functionality of greater than or equal to about 2.0. In particular, the suitable polyisocyanates and/or prepolymers thereof to be used as component (1) in the present invention typically have NCO group contents of greater than about 20%. Suitable aromatic polyisocyanates for the present invention include toluene diisocyanate including 2,4-toluene diisocyanate, 2,6-toluene diisocyanate and mixtures thereof, diphenylmethane diisocyanate including 2,2'-diphenylmethane diisocyanate, 2,4'-diphenylmethane diisocyanate, 4,4'-diphenylmethane diisocyanate, and isomeric mixtures thereof, polyphenylmethane polyisocyanates, etc. Preferred polyisocyanates for the present invention include 2,4-toluene diisocyanate, 2,6-toluene diisocyanate and mixtures thereof. A particularly preferred aromatic polyisocyanate component for the present invention comprises a mixture of 80% by weight of 2,4-toluene diisocyanate and 20% by weight of 2,6-toluene diisocyanate.

The isocyanate-reactive component (2) suitable for the flexible foams of the present invention comprises one or more polyoxyalkylene polyether polyols.

Suitable polyoxyalkylene polyether polyols for this aspect of the invention include those having a hydroxyl functionality of at least about 2. The hydroxyl functionality of the suitable polyoxyalkylene polyether polyols is less than or equal to about 8, preferably less than or equal to about 6, and more preferably less than or equal to about 4. The suitable polyoxyalkylene polyether polyols may also have functionalities ranging between any combination of these upper and lower values, inclusive, e.g., from at least about 2 to no more than about 8, preferably from at least about 2 to no more than about 6, and more preferably from at least about 2 to no more than about 4. It is most preferred that the polyoxyalkylene polyether polyol have a hydroxyl functionality of about 3. Typically, the average OH (hydroxyl) numbers of suitable polyoxyalkylene polyether polyols is at least about 20, preferably at least about 25, and more preferably at least about 30. Polyoxyalkylene polyether polyols typically also have average OH numbers of less than or equal to about 250, preferably less than or equal to about 150, and more preferably less than or equal to about 75. The suitable polyoxyalkylene polyether polyols may also have OH (hydroxyl) numbers ranging between any combination of these upper and lower values, inclusive, e.g, from at least about 20 to about 250, preferably from at least about 25 to about 150, and more preferably from at least about 30 to about 75.

Suitable polyoxyalkylene polyether polyols for the isocyanate-reactive component (2) of the flexible foams are typically the reaction product of a suitable initiator or starter and one or more alkylene oxides. The polyoxyalkylene polyether polyols of this aspect of the invention typically have less than or equal to about 30% by weight of copolymerized oxyethylene, based on 100% by weight of oxyalkylene present. It is preferred that these polyether polyols have less than or equal to about 25% by weight of copolymerized oxyethylene, based on 100% by weight of oxyalkylene.

Thus, the isocyanate-reactive component (2) of the flexible foams comprises one or more polyoxyalkylene polyether polyols and is typically described in terms of their hydroxyl functionality, OH (hydroxyl) number, and the amount of copolymerized oxyethylene. Generally speaking, suitable polyoxyalkylene polyether polyols include those which contain from about 2 to about 8 hydroxyl groups per molecule, having an OH (hydroxyl) number of from about 20 to about 250, and containing less than equal to about 30% by weight of copolymerized oxyethylene, based on 100% by weight of oxyalkylene present in the polyether polyol.

As used herein, the hydroxyl number is defined as the number of milligrams of potassium hydroxide required for the complete hydrolysis of the fully phthalylated derivative prepared from 1 gram of polyol. The hydroxyl number can also be defined by the equation:

$$OH = (56.1 \times 1000 / \text{eq. wt.}) = (56.1 \times 1000) \times (f / \text{mol. wt.})$$

wherein:
OH: represents the hydroxyl number of the polyol,
eq. wt.: weight per molar equivalents of contained OH groups,
f: represents the nominal functionality of the polyol, i.e. the average number of active hydrogen groups on the initiator or initiator blend used in producing the polyol, and
mol. wt.: represents the nominal number average molecular weight based on the measured hydroxyl number and the nominal functionality of the polyol.

Among the polyoxyalkylene polyols which can be used are the alkylene oxide adducts of a variety of suitable initiator molecules. Non-limiting examples include dihydric initiators such as ethylene glycol, diethylene glycol, triethylene glycol, propylene glycol, dipropylene glycol, tripropylene glycol, neopentyl glycol, 1,3-propanediol, 1,4-butanediol, 1,6-hexanediol, 1,4-cyclo-hexanediol, 1,4-cyclohexane-dimethanol, hydroquinone, hydroquinone bis (2-hydroxyethyl)ether, the various bisphenols, particularly bisphenol A and bisphenol F and their bis(hydroxyalkyl) ether derivatives, aniline, the various N-N-bis(hydroxyalkyl)anilines, primary alkyl amines and the various N-N-bis(hydroxyalkyl)amines; trihydric initiators such as glycerine, trimethylolpropane, trimethylolethane, the various alkanolamines such as ethanolamine, diethanolamine, triethanolamine, propanolamine, dipropanolamine, and tripropanolamine; tetrahydric initiators such as pentaerythritol, ethylene diamine, N,N,N',N'-tetrakis[2-hydroxyalkyl]ethylenediamines, toluene diamine and N,N,N',N'-tetrakis[hydroxyalkyl]toluene diamines; pentahydric initiators such as the various alkylglucosides, particularly α-methylglucoside; hexahydric initators such as sorbitol, mannitol, hydroxyethylglucoside, and hydroxypropyl glucoside; octahydric initiators such as sucrose; and higher functionality initiators such as various starch and partially hydrolyzed starch-based products, and methylol group-containing resins and novolak resins such as those prepared from the reaction of as aldehyde, preferably formaldehyde, with a phenol, cresol, or other aromatic hydroxyl-containing compound.

Such starters or initiators are typically copolymerized with one or more alkylene oxides to form the polyether polyols of the invention. Examples of such alkylene oxides include ethylene oxide, propylene oxide, butylenes oxide, styrene oxide and mixtures thereof. Mixtures of these alkylene oxides can be added simultaneously or sequentially to provide internal blocks, terminal blocks or random distribution of the alkylene oxide groups in the polyether polyol. A preferred mixture comprises ethylene oxide and propylene oxide, provided the total amount of copolymerized oxyethylene in the resultant polyether polyol is less than 30% by weight.

The most common process for polymerizing such polyols is the base catalyzed addition of the oxide monomers to the active hydrogen groups of the polyhydric initiator and subsequently to the oligomeric polyol moieties. Potassium hydroxide or sodium hydroxide are the most common basic catalyst used. Polyols produced by this process can contain significant quantities of unsaturated monols resulting from the isomerization of oxypropylene monomer to allyl alcohol under the conditions of the reaction. This monofunctional alcohol can then function as an active hydrogen site for further oxide addition.

A preferred class of polyoxyalkylene polyols are the low unsaturation (low monol) poly(oxypropylene/oxyethylene) polyols manufactured with double metal cyanide catalyst. The poly(oxypropylene/oxyethylene) low unsaturation polyols as herein defined are prepared by oxyalkylating a suitably hydric initiator compound with propylene oxide and ethylene oxide in the presence of a double metal cyanide catalyst. Preferably, double metal cyanide complex catalysts such as those disclosed in U.S. Pat. Nos. 5,158,922 and 5,470,813, the disclosures of which are hereby incorporated by reference, are used. Particularly preferred polyols include the random poly(oxypropylene/oxyethylene) polyols having low unsaturation as described herein, for example, U.S. Pat. No. 5,605,939, the disclosure of which is hereby incorporated by reference. The amount of ethylene oxide in the ethylene oxide/propylene oxide mixture may be increased during the latter stages of the polymerization to increase the primary hydroxyl content of the polyol. Alternatively, the low unsaturation polyol may be capped with ethylene oxide using non-DMC catalysts. Of course, it is necessary here to observe the above described limits for ethylene oxide content in the resultant polyether polyols.

When the oxyalkylation is performed in the presence of double metal cyanide catalysts, it is preferable that initiator molecules containing strongly basic groups such as primary and secondary amines be avoided. Further, when employing double metal cyanide complex catalysts, it is generally desirable to oxyalkylate an oligomer which comprises a previously oxyalkylated "monomeric" initiator molecule. It has been found, particularly with vicinal hydroxyl groups, that DMC oxyalkylation is initially slow and may be preceded by a considerable "induction period" where essentially no oxyalkylation takes place. Use of a polyoxyalkylene oligomer having an hydroxyl number greater than about 600 has been found to mitigate these effects. The polyoxyalkylene oligomeric initiators may be prepared by oxyalkylating a "monomeric" initiator in the presence of traditional basic catalysts such as sodium or potassium hydroxide or other non-DMC catalysts. It is typically necessary to neutralize and/or remove these basic catalysts prior to addition and initiation of the DMC catalyst.

Polyol polymer dispersions represent another preferred class of polyoxyalkylene polyol compositions. Polyol polymer dispersions are dispersions of polymer solids in a polyol. Polyol polymer dispersions which are useful in the present invention include the "PHD" and "PIPA" polymer modified polyols as well as the "SAN" polymer polyols. Any "base polyol" known in the art can be suitable for production of polymer polyol dispersions; however, the poly(oxyalkylene) polyols described previously herein are preferred.

SAN polymer polyols are typically prepared by the in-situ polymerization of one or more vinyl monomers, preferably acrylonitrile and styrene, in a polyol, preferably, a poly(oxyalkylene) polyol, having a minor amount of natural or induced unsaturation. Methods for preparing SAN polymer polyols are described in, for example, U.S. Pat. Nos. 3,304,273; 3,383,351; 3,523,093; 3,652,639; 3,823,201; 4,104,236; 4,111,865; 4,119,586; 4,125,505; 4,148,840; 4,172,825; 4,524,157; 4,690,956; Re-28,715; and Re-29,118, the disclosures of which are hereby incorporated by reference.

SAN polymer polyols typically have a polymer solids content within the range of from about 3 to about 60 wt. %, preferably, from about 5 to about 50 wt. %, based on the total weight of the SAN polymer polyol. As mentioned above, SAN polymer polyols are typically prepared by the in situ polymerization of a mixture of acrylonitrile and styrene in a polyol. When used, the ratio of styrene to acrylonitrile polymerized in-situ in the polyol is typically in the range of from about 100:0 to about 0:100 parts by weight, based on the total weight of the styrene/acrylonitrile mixture, and preferably from 80:20 to 0:100 parts by weight.

PHD polymer modified polyols are typically prepared by the in-situ polymerization of an isocyanate mixture with a diamine and/or hydrazine in a polyol, preferably, a polyether polyol. Methods for preparing PHD polymer polyols are described in, for example, U.S. Pat. Nos. 4,089,835 and 4,260,530, the disclosures of which are hereby incorporated by reference. PIPA polymer modified polyols are typically prepared by the in situ polymerization of an isocyanate mixture with a glycol and/or glycol amine in a polyol.

PHD and PIPA polymer modified polyols typically have a polymer solids content within the range of from about 3 to about 30 wt. %, preferably, from about 5 to about 25 wt. %, based on the total weight of the PHD or PIPA polymer modified polyol. As mentioned above, PHD and PIPA polymer modified polyols are typically prepared by the in-situ polymerization of an isocyanate mixture, typically, a mixture which is composed of about 80 parts by weight, based on the total weight of the isocyanate mixture, of 2,4-toluene diisocyanate and about 20 parts by weight, based on the total weight of the isocyanate mixture, of 2,6-toluene diisocyanate, in a polyol, preferably, a poly(oxyalkylene) polyol.

By the term "polyoxyalkylene polyol or polyoxyalkylene polyol blend" is meant the total of all polyoxyalkylene polyether polyols, whether polyoxyalkylene polyether polyols containing no polymer dispersion or whether the base polyol(s) of one or more polymer dispersions.

It should also be appreciated that blends or mixtures of various useful polyoxyalkylene polyether polyols may be used if desired. It is possible that one of the polyether polyols has a functionality, OH number, etc. outside of the ranges identified above. Of course, it is still essential that the overall blend or mixture of polyether polyols satisfies the above identified criteria for hydroxyl functionality, OH number and % by wt. of copolymerized oxyethylene.

Suitable blowing agents to be used as component (4) of the flexible foams of the invention include, for example, halogenated hydrocarbons, water, liquid carbon dioxide, low boiling solvents such as, for example, pentane, and other known blowing agents. Water may be used alone or in conjunction with other blowing agents such as, for example, pentane, acetone, cyclopentanone, cyclohexane, partially or completely fluorinated hydrocarbons, methylene chloride and liquid carbon dioxide. It is preferred that water is used as the sole blowing agent or water used in conjunction with liquid carbon dioxide. Generally, speaking, the quantity of blowing agent present is from about 0.3 to about 30 parts, preferably from about 0.5 to about 20 parts by weight, based on 100 parts by weight of component (2) present in the formulation.

Suitable catalysts for component (5) of the flexible foams of the invention, include, for example, the various polyurethane catalysts which are known to be capable of promoting the reaction between the aromatic polyisocyanate component and the isocyanate-reactive components, including water. Examples of such catalysts include, but are not limited to, tertiary amines and metal compounds as are known and described in the art. Some examples of suitable tertiary amine catalysts include triethylamine, tributylamine, N-methylmorpholine, N-ethyl-morpholine, N,N,N',N'-tetramethylethylene diamine, pentamethyl-diethylene triamine, and higher homologs, 1,4-diazabicyclo[2.2.2]octane, N-methyl-N'-(dimethylaminoethyl) piperazine, bis(dimethylaminoalkyl)-piperazines, N,N-dimethylbenzylamine, N,N-dimethylcyclohexylamine, N,N-diethylbenzylamine, bis(N,N-diethyl-aminoethyl) adipate, N,N,N',N'-tetramethyl-1,3-butanediamine, N,N-dimethyl-.beta.-phenylethylamine, 1,2-dimethylimidazole, 2-methylimidazole, monocyclic and bicyclic amidines, bis(dialkylamino)alkyl ethers, and tertiary amines containing amide groups (preferably formamide groups). The catalysts used may also be the known Mannich bases of secondary amines (such as dimethylamine) and aldehydes (preferably formaldehyde) or ketones (such as acetone) and phenols. Particularly preferred catalysts are triethylenediamine, bis(2-dimethylamino-ethyl) ether, stannous octoate and dibutyltindilaurate.

Suitable catalysts also include certain tertiary amines containing isocyanate reactive hydrogen atoms. Examples of such catalysts include triethanolamine, triisopropanoamine, N-methyldiethanolamine, N-ethyl-diethanolamine, N,N-dimethylethanolamine, their reaction products with alkylene oxides (such as propylene oxide and/or ethylene oxide) and secondary-tertiary amines.

Other suitable catalysts include acid blocked amines (i.e. delayed action catalysts). The blocking agent can be an organic carboxylic acid having 1 to 20 carbon atoms, preferably 1-2 carbon atoms. Examples of blocking agents include 2-ethyl-hexanoic acid and formic acid. Any stoichiometric ratio can be employed with one acid equivalent blocking one amine group equivalent being preferred. The tertiary amine salt of the organic carboxylic acid can be formed in situ, or it can be added to the polyol composition ingredients as a salt. To this end, quaternary ammonium salts are particularly useful. Such acid blocked amine catalysts are known and described in, for example, U.S. Pat. No. 6,013,690, the disclosure of which is hereby incorporated by reference. Additional examples of suitable organic acid blocked amine gel catalysts which may be employed are the acid blocked amines of triethylene-diamine, N-ethyl or methyl morpholine, N,N dimethylamine, N-ethyl or methyl morpholine, N,N dimethylaminoethyl morpholine, N-butyl-morpholine, N,N' dimethylpiperazine, bis(dimethylaminoalkyl)-piperazines, 1,2-dimethyl imidazole, dimethyl cyclohexylamine. Further examples include DABCO® 8154 catalyst based on 1,4-diazabicyclo[2.2.2]octane and DABCO® BL-17 catalyst based on bis(N,N-dimethylaminoethyl) ether (available from Air Products and Chemicals, Inc., Allentown, Pa.) and POLYCAT® SA-1, POLYCAT® SA-102, and POLYCAT® SA-610/50 catalysts based on POLYCAT® DBU amine catalyst (available from Air Products and Chemicals, Inc.) as are known and described in, for example, U.S. Pat. No. 5,973,099, the disclosure of which is herein incorporated by reference. Other acid blocked amine catalysts suitable for the present invention include those described in, for example U.S. Pat. Nos. 4,219,624, 5,112,878, 5,183,583, 5,789,533, 6,395,796, 6,432,864 and 6,525,107, the disclosures of which are hereby incorporated by reference.

Other suitable catalysts include organic metal compounds, especially organic tin, bismuth, and zinc compounds. Suitable organic tin compounds include those containing sulfur, such as dioctyl tin mercaptide, and, preferably, tin(II) salts of carboxylic acids, such as tin(II) acetate, tin(II) octoate, tin(II) ethylhexoate, and tin(II) laurate, as well as tin(IV) compounds, such as dibutyltin dilaurate, dibutyltin dichloride, dibutyltin diacetate, dibutyltin maleate, and dioctyltin diacetate. Suitable bismuth compounds include bismuth neodecanoate, bismuth versalate, and various bismuth carboxylates known in the art. Suitable zinc compounds include zinc neodecanoate and zinc versalate. Mixed metal salts containing more than one metal (such as carboxylic acid salts containing both zinc and bismuth) are also suitable catalysts.

The quantity of catalyst varies widely depending on the specific catalyst used. Generally speaking, suitable levels of catalyst would be readily determined by those skilled in the art of polyurethane chemistry. In accordance with the present invention, it is preferred that the catalyst comprise a mixture of at least one amine catalyst and at least one tin catalyst.

Suitable surfactants to be used as component (6) of the flexible foams of the invention include silicone surfactants such as, for example, polysiloxanes and siloxane/poly(alkylene oxide) copolymers of various structures and molecular weights. The structure of these compounds is generally such that a copolymer of ethylene oxide and propylene oxide is attached to a polydimethyl siloxane radical. Such surfactants are known and described in, for example, U.S. Pat. No. 2,764,565, U.S. Pat. No. 3,887,500 and U.S. Pat. No. 3,957,842, the disclosures of which are hereby incorporated by reference. It is preferred to use surfactants in the present invention, in amounts of from about 0.05 to about 5% by weight, more preferably in amounts of from about 0.2 to about 3% by weight (based on the weight of the weight of component (2) present in the formulation.

Examples of preferred commercially available surfactants include the silicone surfactants B-4690, B-4113 and B-8250, B-2370, B-8707, B-8228, B-8002 and their low fogging (LF) versions, which are available from DeGussa/Goldschmidt and the silicone surfactants Niax U-2000, L-620, L-636, L-5614, L-626, and L-627, which are commercially available from General Electric/Osi and the silicone surfactants Dabco DC5164, DC5169, and DC5043 which are available from Air Products.

In addition, other additives which may be used in the flexible foams of the invention include, for example, release agents, pigments, cell regulators, flame retarding agents, plasticizers, dyes, antistatic agents, antimicrobials, cross-linking agents, antioxidants, UV stabilizers, mineral oils, fillers and reinforcing agents such as glass in the form of fibers or flakes or carbon fibers.

Component (3) of the flexible foam comprises the foam modifier. Suitable foam modifiers may be either a blend of components (3)(a) and (3)(b), or a blend of components (3)(a), (3)(b) and (3)(c).

In the first embodiment, component (a) of the foam modifier (3) comprises from at least about 35% by weight or more, and preferably from at least about 40% by weight or more, based on 100% by weight of component (3), of at least one low molecular weight component selected from the group consisting of 1,3-propanediol, 1,3-butanediol, 1,4-butanediol and mixtures thereof. In addition, component (a) typically comprises no more than about 80% by weight, and preferably no more than about 65% by weight, based on 100% by weight of component (3), of at least one low molecular weight component selected from the group consisting of 1,3-propanediol, 1,3-butanediol, 1,4-butanediol and mixtures thereof. Component (a) may also be present in an amount ranging between any combination of these upper and lower values, inclusive, e.g. from about 35% to about 80%, preferably from about 40% to about 65% by weight, based on 100% by weight of the foam modifier. Component (a) of the foam modifier may be 1,3-propanediol, 1,3-butanediol, 1,4-butanediol or a mixture thereof. As used in this context, a mixture of component (a) is a mixture of 1,3-propanediol with 1,3-butanediol, a mixture of 1,3-propanediol and 1,4-butanediol, a mixture of 1,3-butanediol and 1,4-butanediol, or a mixture of 1,3-propanediol, and 1,3-butanediol and 1,4-butanediol. Also in the first embodiment, component (b) of the foam modifier (3) is typically present in an amount of from at least about 20% by weight or more, and preferably in an amount of at least about 35% by weight or more, based on 100% by weight of (3). In addition, component (b) of the foam modifier will generally be present in an amount of no more than about 65% by weight, and preferably of no more than about 60% by weight, based on 100% by weight of (3). Component (b) may also be present in an amount ranging between any combination of these upper and lower values, inclusive, e.g. from about 20% to about 65%, preferably from about 35% to about 60% by weight, based on 100% by weight of the foam modifier.

Component (b) of the foam modifier comprises one or more polyether polyols having from 2 to 8 hydroxyl groups, an OH number of from about 11 to about 280 and containing greater than about 50% by weight of copolymerized oxyethylene (based on 100% by weight of the oxyalkylene content). In one embodiment of the present invention, when the functionality (i.e. the number of hydroxyl groups) of the polyether polyol is greater than or equal to 4, the molecular weight of the polyether polyol is less than 5,000. These polyether polyols have a corresponding OH number greater than about 45 up to and including about 280.

Suitable polyether polyols to be used as component (b) of the foam modifier compositions include, for example, those polyether polyols having a hydroxyl functionality of at least about 2. The hydroxyl functionality of suitable polyether polyols is less than or equal to about 8, preferably less than or equal to about 6, and more preferably less than 4. It is more particularly preferred that the hydroxyl functionality of the polyether polyols be less than or equal to about 3.8, more preferably less than or equal to about 3.5 and most particularly preferably less than or equal to about 3.3. The suitable polyether polyols may also have functionalities ranging between any combination of these upper and lower values, inclusive, e.g., from at least about 2 to no more than about 8, preferably from at least about 2 to no more than about 6, more preferably from at least about 2 to less than about 4, more particularly preferably from at least about 2 to less than or equal to about 3.8, most preferably from at least about 2 to less than or equal to about 3.5, and most particularly preferably from at least about 2 to less than or equal to about 3.3. In one embodiment, the polyether polyol has a hydroxyl functionality of at least about 2 and no more than about 3.

Typically, the OH (hydroxyl) numbers of suitable polyether polyols is at least about 11, preferably at least about 20, and more preferably at least about 25. Polyether polyols typically also have OH numbers of less than or equal to about 280, preferably less than or equal to about 200, and more preferably less than or equal to about 60. The suitable polyether polyols may also have OH (hydroxyl) numbers ranging between any combination of these upper and lower values, inclusive, e.g, from at least about 11 to about 280, preferably from at least about 20 to about 200, and more preferably from at least about 25 to about 60.

As used herein, the hydroxyl number is defined as the number of milligrams of potassium hydroxide required for the complete hydrolysis of the fully phthalylated derivative prepared from 1 gram of polyol. The hydroxyl number can also be defined by the equation:

$$OH = (56.1 \times 1000/\text{eq. wt.}) = (56.1 \times 1000 \times f)/\text{mol. wt.}$$

wherein:
OH: represents the hydroxyl number of the polyol,
eq. wt.: weight per molar equivalents of contained OH groups,
f: represents the nominal functionality of the polyol, i.e. the average number of active hydrogen groups on the initiator or initiator blend used in producing the polyol, and
mol. wt.: represents the nominal number average molecular weight based on the measured hydroxyl number and the nominal functionality of the polyol.

Among the polyoxyalkylene polyols which can be used are the alkylene oxide adducts of a variety of suitable initiator molecules. Non-limiting examples include dihydric initiators such as ethylene glycol, diethylene glycol, triethylene glycol, propylene glycol, dipropylene glycol, tripropylene glycol, neopentyl glycol, 1,3-propanediol, 1,4-butanediol, 1,6-hexanediol, 1,4-cyclo-hexanediol, 1,4-cyclohexanedimethanol, hydroquinone, hydroquinone bis (2-hydroxyethyl)ether, the various bisphenols, particularly bisphenol A and bisphenol F and their bis(hydroxyalkyl) ether derivatives, aniline, the various N-N-bis(hydroxyalkyl)anilines, primary alkyl amines and the various N-N-bis(hydroxyalkyl)amines; trihydric initiators such as glycerine, trimethylolpropane, trimethylolethane, the various alkanolamines such as ethanolamine, diethanolamine, triethanolamine, propanolamine, dipropanolamine, and tripropanolamine; tetrahydric initiators such as pentaerythritol, ethylene diamine, N,N,N',N'-tetrakis[2-hydroxyalkyl]ethylenediamines, toulene diamine and N,N, N',N'-tetrakis[hydroxyalkyl]toluene diamines; pentahydric initiators such as the various alkylglucosides, particularly α-methylglucoside; hexahydric initators such as sorbitol, mannitol, hydroxyethylglucoside, and hydroxypropyl glucoside; octahydric initiators such as sucrose; and higher functionality initiators such as various starch and partially hydrolyzed starch-based products, and methylol group-containing resins and novolak resins such as those prepared from the reaction of as aldehyde, preferably formaldehyde, with a phenol, cresol, or other aromatic hydroxyl-containing compound.

Such starters or initiators are typically copolymerized with ethylene oxide and, optionally, one or more alkylene oxides to form the polyether polyols of the invention. Examples of such alkylene oxides include propylene oxide, butylenes oxide, styrene oxide and mixtures thereof. Mixtures of these alkylene oxides can be added simultaneously or sequentially with ethylene oxide to provide internal blocks, terminal blocks or random distribution of the alkylene oxide groups in the polyether polyol. A preferred mixture comprises ethylene oxide and propylene oxide, provided the total amount of copolymerized oxyethylene in the resultant polyether polyol is greater than 50% by weight.

The most common process for polymerizing such polyols is the base catalyzed addition of the oxide monomers to the active hydrogen groups of the polyhydric initiator and subsequently to the oligomeric polyol moities. Potassium hydroxide or sodium hydroxide are the most common basic catalyst used. Residues from these catalysts are typically removed after completion of the polymerization.

Another process for producing this class of polyoxyalkylene polyols is through the use of double metal cyanide catalyst. The poly(oxypropylene/oxyethylene) polyols as herein defined are prepared by oxyalkylating a suitably hydric initiator compound with propylene oxide and ethylene oxide in the presence of a double metal cyanide catalyst. Preferably, double metal cyanide complex catalysts such as those disclosed in U.S. Pat. Nos. 5,158,922 and 5,470,813, the disclosures of which are hereby incorporated by reference, are used. Particularly preferred polyols include the random poly(oxypropylene/oxy-ethylene) polyols as described in, for example, U.S. Pat. No. 5,605,939, the disclosure of which is hereby incorporated by reference. The amount of ethylene oxide in the ethylene oxide/propylene oxide mixture may be increased during the latter stages of the polymerization to increase the primary hydroxyl content of the polyol. However, it is preferred to avoid extended periods of feeding mixtures containing ethylene oxides levels above about 80% due to formation of solid moieties in the polyol. Alternatively, the low unsaturation polyol may be capped with ethylene oxide using non-DMC catalysts. Of course, it is necessary here to observe the above described limits for ethylene oxide content in the resultant polyether polyols.

When the oxyalkylation is performed in the presence of double metal cyanide catalysts, it is preferable that initiator molecules containing strongly basic groups such as primary and secondary amines be avoided. Further, when employing double metal cyanide complex catalysts, it is generally desirable to oxyalkylate an oligomer which comprises a previously oxyalkylated "monomeric" initiator molecule. It has been found, particularly with vicinal hydroxyl groups, that DMC oxyalkylation is initially slow and may be preceded by a considerable "induction period" where essentially no oxyalkylation takes place. Use of a polyoxyalkylene oligomer having an hydroxyl number greater than about 600 has been found to mitigate these effects. The polyoxyalkylene oligomeric initiators may be prepared by oxyalkylating a "monomeric" initiator in the presence of traditional basic catalysts such as sodium or potassium hydroxide or other non-DMC catalysts. It is typically necessary to neutralize and/or remove these basic catalysts prior to addition and initiation of the DMC catalyst.

It should also be appreciated that blends or mixtures of various useful polyoxyalkylene polyether polyols may be used if desired. It is possible that one of the polyether polyols has a functionality, OH number, etc. outside of the ranges identified above. Of course, it is still essential that the overall blend or mixture of polyether polyols satisfies the above identified criteria for hydroxyl functionality, OH number and % by wt. of copolymerized oxyethylene.

In the second embodiment, component (a) of the foam modifier (3) is present in an amount of from at least about 35% by weight or more, preferably from at least about 40% by weight or more, and most preferably from at least about 50% by weight or more, based on 100% by weight of component (3). Component (a) of the foam modifier comprises at least one low molecular weight component selected from the group consisting of 1,3-propanediol, 1,3-butanediol, 1,4-butanediol and mixtures thereof. In addition, component (a) typically is present in an amount of no more than about 75% by weight, and preferably no more than about 60% by weight, based on 100% by weight of component (3). Component (a) may also be present in an amount ranging between any combination of these upper and lower values, inclusive, e.g. from about 35% to about 75%, preferably from about 40% to about 60% by weight, and most preferably from about 50% to about 60% by weight, based on 100% by weight of the foam modifier.

Also, in the second embodiment, component (b), the one or more polyether polyols of the foam modifier is present in an amount of at least about 20% by weight or more, and preferably from at least about 30% by weight or more, based on 100% by weight of component (3). In addition, component (b), the one or more polyether polyols of the foam modifier is typically present in an amount of no more than about 60% by weight, and preferably no more than about 50% by weight, based on 100% by weight of component (3). Component (b) of the foam modifier may also be present in an amount ranging between any combination of these upper and lower values, inclusive, e.g. from about 20% to about 60%, and preferably from about 30% to about 50% by weight, based on 100% by weight of the foam modifier. Suitable polyether polyols for the foam modifier are as previously described.

The second embodiment of the foam modifier additionally comprises component (c) dipropylene glycol. Component (c), dipropylene glycol of the foam modifier is typically present in an amount of from at least about 5% by weight, and preferably of from at least about 10% by weight, based on 100% by weight of the foam modifier (3). In addition, dipropylene glycol is typically present in an amount of no more than about 25% by weight, and preferably of no more than about 20% by weight, based on 100% by weight of the foam modifier (3). Component (c) of the foam modifier may also be present in an amount ranging between any combination of these upper and lower values, inclusive, e.g. from about 5% to about 25%, and preferably from about 10% to about 20% by weight, based on 100% by weight of the foam modifier.

The flexible foams according to the present invention may be molded or free rise (i.e. slabstock) using conventional processing techniques at isocyanate indexes ranging from at least about 98, and preferably from at least about 100. The isocyanate index is preferably less than or equal to about 120. The isocyanate index may vary between any of these upper and lower values, inclusive. By the term "Isocyanate Index" (also commonly referred to as "NCO index"), is defined herein as the equivalents of isocyanate, divided by the total equivalents of isocyanate-reactive hydrogen containing materials, multiplied by 100. In calculating the Isocyanate Index, all NCO-reactive components (including water) are taken into consideration. In practice, the flexible foams of this invention are prepared by mixing the aforementioned components in standard foam processing equipment in accordance with techniques known to those skilled in the art. In preparing the flexible foam, the ingredients are intimately mixed with each other by the so-called "one-shot" method to provide a foam by a one-step process. In the "one-shot" process, the isocyanate-reactive and polyisocyanate reactants, the catalysts, blowing agents, surfactants and other optional ingredients, and the novel foam modifiers as described herein, are mixed together and then dispersed for reaction.

The preferred mode of foam preparation using the current invention is the so called free-rise or slabstock process. In one widely used embodiment, the foaming mixture is discharged from a mixing head onto a continuously moving, generally open-topped and open-ended conveyor. As the conveyor advances, foam reactions cause the foam to expand freely upwardly, hence the term free-rise foam. In another known process, i.e. the "Vertifoam" process, the foam slab is produced in an upwardly moving direction by dispensing the foaming mixture into, and allowing it to expand freely outwardly within flexible liners that are moved in a vertical direction. Another embodiment is the box foam process in which the reacting mixture is deposited into a large box and allow to rise. These methods are well-known to those skilled in the art.

Due to the foam modifier employed in accordance with the present invention, the production of various types and grades of flexible foam can be achieved with less scrap and in many cases with improved properties.

For example, in accordance with the invention, many grades of conventional slabstock foams (Normal Support grades as specified in ASTM D 3453-01) can be prepared without splits and other stability defects while achieving a high porosity in the foam. It is well known to those in the industry that these conventional foams are highly prone to splitting when the heat generation from the isocyanate reactions does not yield a sufficiently high exotherm to promote the foaming curing reactions as is often the case when the level of water blowing agent in the formulation is below about 3.5% based on the total weight of polyol. Similar problems are also encountered even at higher water levels when non-reactive/auxilliary blowing agents such as liquid carbon dioxide, acetone or halocarbons are used. To avoid splitting, it is the common practice to raise the levels of catalysts, especially the organometalic (ex. stannous octoate) gelling catalyst. However, increasing the gelling catalyst results in foam with reduced air flow which lowers its performance especially in regards to compression sets and can make the foam non-salable. The modifiers of the current invention have been found to significantly reduce splitting in these foams, and unexpectedly, to accomplish this while maintaining high levels of air flow in the resultant foam.

A further embodiment is that the same modifier compositions can be used to improve the processing and quality of high support (HS) and high support—high resilience (HS-HR) flexible slabstock foams as specified in ASTM D 3453 01. Many high support—high resilience flexible foams are produced with added cross-linkers such as diethanolamine or triethanolamine which impart processing stability, but which can result in shrinkage and diminished air flow in the foam. These cross-linkers also can decreased strength properties of the foam. It has been found that the same modifier compositions that improve the processing of conventional foams also impart better strength and better overall properties to HS and HS-HR flexible foams. The modifier can also impart a fine cell structure with improved hand feel.

In accordance with the present invention, the addition of a single foam modifier for HS, HS-HR and conventional slabstock foams brings significant economic advantages to the slabstock foam manufacturer. It avoids the need for multiple storage tanks and multiple pumping and delivery system to the mixing head. In addition, the chance for cross-contamination and formulating errors is reduced.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight relative to the weight of polyol in the formulations, respectively.

EXAMPLES

The following components were used to prepare foam modifiers in accordance with the present invention:
MPD: 2-methyl-1,3-propanediol
1,3-PDO: 1,3-propanediol
1,4-BDO: 1,4-butanediol
Polyol A: a glycerine initiated polyether polyol having a functionality of about 3, an OH number of about 37, and containing about 71% by weight of ethylene oxide (based on 100% by wt. of alkylene oxide)
DPG: dipropylene glycol In accordance with the present invention, foam modifiers were prepared by blending the three components together in relative parts by weight as shown in Table 1.

TABLE 1

Foam Modifiers

| | Foam Modifier | | | | | |
|---|---|---|---|---|---|---|
| | FM1 | FM2 | FM3 | FM4 | FM5 | FM6* |
| 1,4-BDO | 49.7 | 56.6 | 50.2 | 44.0 | 49.9 | |
| Polyol A | 36.9 | 28.0 | 36.1 | 44.0 | 36.6 | |
| DPG | 13.4 | 15.4 | 13.7 | 12.0 | 13.5 | |
| MPD | | | | | | 100 |

*a commercially available compound known to be useful as a foam modifier

Foam Modifier 5 (FM5) from Table 1 was a clear, white liquid, with a hydroxyl number of about 746 mg KOH/g, a viscosity of about 266 cSt at 25° C., a specific gravity of about 1.05 at 25° C. and a freezing point of about 11° C.

The following components were used to prepare flexible foams:
Polyol B: an 8% dispersion of SAN (styrene-acrylonitrile) in a reactive base polyol blend. The base polyols were produced by KOH catalyzed addition of PO and EO to initiators (glycerine/sorbitol). The average OH number of the polyol blend was about 34, the nominal functionality was about 4.4, the % EO was about 17% and the primary hydroxyl content was about 71%
Polyol C: a glycerine and propylene glycol initiated polyether polyol having a functionality of about 2.8, an OH number of about 56 and an EO content of about 7% by weight. The polyol was produced by the DMC catalyzed addition of ethylene oxide and propylene oxide to the initiators Polyol D: a propylene glycol/sucrose co-initiated polyether polyol having a functionality of about 5.24, an OH number of about 60 and containing greater than about 75% by weight of EO DEOA: diethanolamine Fyrol FR2: tris[1,3-dichloro-2-propyl]phosphate Surfactant A: a silicone surfactant commercially available as Niax U-2000

Surfactant B: a silicone surfactant commercially available as Niax L-620

Catalyst A: an amine catalyst commercially available as Niax C 183

Catalyst B: dibutyltin dilaurate, commercially available as Dabco T-12

Catalyst C: a stannous octoate catalyst, commercially available as Dabco T-9

Catalyst D: an amine catalyst, i.e. bis(2-dimethylaminoethyl)ether, commercially available as Niax A-1

TD-80: an isomeric mixture of 80% by weight 2,4-toluene diisocyanate and 20% by weight 2,6-toluene diisocyanate All foam results were obtained from bench mixing procedures (except Foams 5 and 6) which consisted of weighing all components, except the tin and TDI, into a one quart, ice cream container. The contents of the container were mixed, at 2000 rpm, for 90 seconds on a drill press equipped with a six bladed agitator. After the 90 second mix time, the drill press was stopped and the tin catalyst was added to the mixture. After 15 seconds the mixer was restarted and the TDI was added after five to eight seconds of additional mixing. Mixing was continued until a total of 120 seconds had passed since the beginning of the original mixing step. Once the mixed reactants began to rise in the ice cream container, the contents of the container were poured into a 14"×14"×6' cake box and allowed to rise for a total of five minutes. The cake box was then placed into an oven at 120° C. for five minutes to "cure" the top skin for ease of handling. Cure was continued for 1 to 3 days at ambient conditions before cutting the contents of the cake box to yield a 12"×12"×4" specimen for property testing. Testing was generally performed according to ASTM methods.

TABLE 2 shows the results of a tin latitude study which was conducted in the lab using the conventional flexible foam formulation designated herein as Conventional Flexible Foam Formulation A. Foam Modifier FM5 and Foam Modifier FM6 were compared with each other at equal molar equivalence levels and with a control example that did not contain a foam modifier. FM6 is a commercially available compound known to be useful as a foam modifier.

The improvement in process latitude with FM5 is apparent from this study. See TABLE 2. The control formulation progressed directly from splitting at below 0.20 pphp of tin catalyst to reduced air flow at 0.22 pphp of tin catalyst, and to shrinking at 0.3 pphp of tin catalyst. FM6 shifted the point of splitting to a lower tin level (i.e. 0.14 pphp of tin catalyst), but the foam still exhibited reduced air flow as the tin content was increased marginally beyond this level. FM5 also shifted the point of splitting to lower tin level (i.e. 0.12 pphp of tin catalyst), but provided a significantly broader range (i.e. 0.14 to 0.22 pphp of tin catalyst) over which open foam could be produced.

| Conventional Flexible Foam Formulation A | |
| --- | --- |
| Component | Parts by weight |
| Polyol C | 100.0 |
| Water (distilled) | 2.50 |
| Foam Modifier 5 (FM5) | see Table 2 |
| Foam Modifier 6 (FM6) | see Table 2 |
| Surfactant B | 0.40 |
| Catalyst D | 0.25 |
| Catalyst C | see Table 2 |
| NCO Index (TD-80) | 98 |

TABLE 2

Process Range with Different Foam Modifiers and No Modifier: Conventional Flexible Foam Formulation A

| Catalyst C (pphp) | | 0.34 | 0.30 | 0.26 | 0.22 | 0.20 | 0.18 | 0.16 | 0.14 | 0.12 | 0.10 |
| --- | --- | --- | --- | --- | --- | --- | --- | --- | --- | --- | --- |
| No Foam Modifier | Air Flow*/ Comment** | —/ pruned[1] | 0.38/ shrunk[2] | 0.54/ good | 1.65/ good | 2.96/ split | 2.69/ split | | | | |
| 1.97 pbw FM5 | Air Flow*/ Comment** | | | | 0.42/ good | 1.96/ good | 4.17/ good | 4.20/ good | 4.53/ good | 3.47/ split | 2.71/ split |
| 1.18 pbw FM6 | Air Flow*/ Comment** | | | | —/ pruned[1] | 0.59/ shrunk[2] | 0.66/ good | 2.44/ good | 1.35/ split | | |

*airflow is reported in cfm
**comments report any noticeable changes in cakebox foams upon cooling
[1] the term pruned designates a foam that shriveled to ca. 50% or less of its original size
[2] the term shrunk designates a foam that shrank upon curing and cooling by 10 to 20%

TABLE 3

Normal Support Conventional Foam Formulation - Foams 1 to 4

| Component | Foam 1 | Foam 2 | Foam 3 | Foam 4 |
| --- | --- | --- | --- | --- |
| Polyol C | 100.00 | 100.00 | 100.00 | 100.00 |
| Water | 2.50 | 2.50 | 2.50 | 2.50 |
| FM6 | 1.00 | | | |
| FM5 | | 1.00 | 1.67 | 2.50 |
| Surfactant B | 0.40 | 0.40 | 0.40 | 0.40 |
| Catalyst A | 0.20 | 0.20 | 0.20 | 0.20 |

TABLE 3-continued

Normal Support Conventional Foam Formulation - Foams 1 to 4

| Component | Foam 1 | Foam 2 | Foam 3 | Foam 4 |
|---|---|---|---|---|
| Catalyst C | 0.20 | 0.20 | 0.20 | 0.20 |
| TD-80 | 34.20 | 33.45 | 34.21 | 35.15 |
| Isocyanate Index | 98 | 98 | 98 | 98 |

TABLE 4

Physical Properties of Foams 1 to 4

| Property | Foam 1 | Foam 2 | Foam 3 | Foam 4 |
|---|---|---|---|---|
| Density (lb/ft$^3$) | 2.4 | 2.43 | 2.41 | 2.41 |
| Resilience (%) | 22 | 37 | 28 | 23 |
| Air Flow (ft$^3$/min) | 0.49 | 0.91 | 0.48 | 0.44 |
| IFD 25% (lb/50 in$^2$) | 19.54 | 22.88 | 22.19 | 16.82 |
| Tensile Strength (psi) | 12.04 | 11.92 | 12.29 | 13.53 |
| Elongation (%) | 274 | 257.2 | 263 | 264.4 |
| Tear Strength (pli) | 1.557 | 1.663 | 1.73 | 1.69 |
| HACS 75% (%) | 11.85 | 9.57 | 10.46 | 14.11 |
| Wet Set 50% (%) | 16.02 | 6.64 | 9.137 | 17.7 |

In Foams 5 and 6, a box foam machine was used to produce large buns (i.e. approximate size was 1 m×1 m×1.5 m) of foam for physical property testing. The buns were allowed to cure for one to three days before multiple specimens were cut from the center. The specimens were then aged for at least 24 hours under constant temperature—constant humidity conditions before measuring the standard foam physical/mechanical properties. Physical properties reported are the average of results from the multiple samples cut.

TABLE 5

Normal Support Conventional Foam Formulation - Foams 5 and 6

| Component | Foam 5 Parts by weight | Foam 6 Parts by weight |
|---|---|---|
| Polyol C | 100.0 | 100.0 |
| Water (distilled) | 2.50 | 2.50 |
| Foam Modifier 5 (FM5) | 1.18 | |
| Foam Modifier 6 (FM6) | | 2 |
| Surfactant A | 0.40 | 0.40 |
| Catalyst A | 0.25 | 0.25 |
| Catalyst C | 0.225 | 0.225 |
| TD-80 | 34.4 | 34.4 |
| NCO Index | 98 | 98 |

TABLE 6

Physical Properties of Foams 5 and 6

| Property | Foam 5 | Foam 6 |
|---|---|---|
| Density (lb/ft$^3$) | 2.4 | 2.4 |
| Resilience (%) | 36.3 | 40.5 |

TABLE 6-continued

Physical Properties of Foams 5 and 6

| Property | Foam 5 | Foam 6 |
|---|---|---|
| Air Flow (ft$^3$/min) | 0.7 | 1.1 |
| IFD 25% (lb/50 in$^2$) | 34.1 | 37.5 |
| IFD 65% (lb/50 in$^2$) | 72.7 | 78.2 |
| IFD 25% Return | 26.8 | 29.2 |
| Return Value @ 25% | 78.5 | 77.8 |
| S.F. 65%/25% | 2.1 | 2.1 |
| Tensile Strength (psi) | 13.6 | 15.6 |
| Elongation (%) | 220.7 | 223.4 |
| Tear Strength (pli) | 2.6 | 2.4 |
| Compression Set 90% | 6.8 | 2.1 |
| HACS 75% (%) | 4.3 | 2.4 |
| Wet Set 50% (%) | 3.9 | 1.5 |

The next set of foam examples demonstrates the 2-component modifiers of the present invention.

TABLE 7

High Support Flexible Foam Formulations - Foams 7 and 8

| Component | Foam 7 Parts by weight | Foam 8 Parts by weight |
|---|---|---|
| Polyol B | 100 | 100 |
| MPD | 1.0 | 1.0 |
| Polyol A | | 1.0 |
| Water (distilled) | 2 | 2 |
| DEOA | 1.5 | 1.5 |
| Fyrol FR2 | 5 | 5 |
| Surfactant A | 0.8 | 0.8 |
| Catalyst A | 0.2 | 0.2 |
| Catalyst B | 0.03 | 0.03 |
| TD-80 | 34.1 | 34.1 |
| Isocyanate Index | 98 | 98 |

TABLE 8

High Support Flexible Foam Formulations - Foams 9 to 13

| Component | Foam 9 PBW | Foam 10 PBW | Foam 11 PBW | Foam 12 PBW | Foam 13 PBW |
|---|---|---|---|---|---|
| Polyol B | 100 | 100 | 100 | 100 | 100 |
| 1,4-BDO | 1.0 | 1.0 | 1.0 | 1.0 | 1.0 |
| Polyol A | 0.25 | 0.5 | 1.0 | 2.0 | 4.0 |
| Water (distilled) | 2 | 2 | 2 | 2 | 2 |
| DEOA | 1.5 | 1.5 | 1.5 | 1.5 | 1.5 |
| Fyrol FR2 | 5 | 5 | 5 | 5 | 5 |
| Surfactant A | 0.8 | 0.8 | 0.8 | 0.8 | 0.8 |
| Catalyst A | 0.2 | 0.2 | 0.2 | 0.2 | 0.2 |
| Catalyst B | 0.03 | 0.03 | 0.03 | 0.03 | 0.03 |
| TD-80 | 34.1 | 34.1 | 34.1 | 34.2 | 34.3 |
| Isocyanate Index | 98 | 98 | 98 | 98 | 98 |

TABLE 9

High Support - High Resilience Flexible Foam Formulations - Foams 14 to 18

| Component | Foam 14 PBW | Foam 15 PBW | Foam 16 PBW | Foam 17 PBW | Foam 18 PBW |
|---|---|---|---|---|---|
| Polyol B | 100 | 100 | 100 | 100 | 100 |
| MPD | 1.50 | | | | |
| 1,3-PDO | | 1.25 | 1.24 | | |
| 1,4-BDO | | | | 1.49 | 1.48 |

TABLE 9-continued

High Support - High Resilience Flexible Foam Formulations - Foams 14 to 18

| Component | Foam 14 PBW | Foam 15 PBW | Foam 16 PBW | Foam 17 PBW | Foam 18 PBW |
|---|---|---|---|---|---|
| Polyol A |  | 0.62 |  | 0.38 |  |
| Polyol D |  |  | 0.62 |  | 0.38 |
| Water (distilled) | 2 | 2 | 2 | 2 | 2 |
| DEOA | 1.5 | 1.5 | 1.5 | 1.5 | 1.5 |
| Fyrol FR2 | 5 | 5 | 5 | 5 | 5 |
| Surfactant A | 0.8 | 0.8 | 0.8 | 0.8 | 0.8 |
| Catalyst A | 0.2 | 0.2 | 0.2 | 0.2 | 0.2 |
| Catalyst B | 0.03 | 0.03 | 0.03 | 0.03 | 0.03 |
| TD-80 | 31.9 | 31.9 | 31.9 | 31.9 | 31.9 |
| Isocyanate Index | 103 | 103 | 103 | 103 | 103 |

TABLE 10

Foam Properties for Foams 7 to 13

| Property | Foam 7 | Foam 8 | Foam 9 | Foam 10 | Foam 11 | Foam 12 | Foam 13 |
|---|---|---|---|---|---|---|---|
| Density (lb/ft$^3$) | 2.39 | 2.43 | 2.37 | 2.36 | 2.45 | 2.42 | 2.48 |
| Resilience (%) | 33 | 29 | 37 | 33 | 32 | 39 | 37 |
| Air Flow (ft$^3$/min) | 1.94 | 0.5 | 1.53 | 1.45 | 1.31 | 2.62 | 1.28 |
| IFD 25% (lb/50 in$^2$) | 23.78 | 23.9 | 22.67 | 22.84 | 22.85 | 22.16 | 21.71 |
| IFD 65% (lb/50 in$^2$) | 48.79 | 47.65 | 46.45 | 45.85 | 45.3 | 43.24 | 43.33 |
| Tear Str. (psi) | 1.743 | 1.913 | 1.92 | 1.877 | 1.877 | 2.05 | 1.667 |
| HACS 75% (%) | 14.24 | 14.28 | 14.99 | 15.76 | 12.46 | 13.81 | 11.98 |
| Wet Set 50% (%) | 10.18 | 6.97 | 6.743 | 7.297 | 5.63 | 4.85 | 4.987 |

TABLE 11

Foam Properties for Foams 14 to 18

| Property | Foam 14 | Foam 15 | Foam 16 | Foam 17 | Foam 18 |
|---|---|---|---|---|---|
| Density (lb/ft$^3$) | 2.83 | 2.9 | 2.91 | 2.88 | 2.91 |
| Resilience (%) | 60 | 62 | 62 | 62 | 64 |
| Air Flow (ft$^3$/min) | 1.85 | 1.75 | 1.89 | 1.63 | 2.07 |
| IFD 25% (lb/50 in$^2$) | 27.21 | 26.88 | 27.09 | 27.53 | 27.1 |
| IFD 65% (lb/50 in$^2$) | 69.57 | 67.85 | 68.18 | 69.08 | 68.22 |
| Tear Str. (psi) | 0.933 | 0.857 | 0.887 | 0.867 | 0.89 |
| HACS 75% (%) | 7.107 | 5.813 | 5.5 | 5.973 | 5.847 |
| Wet Set 50% (%) | 8.923 | 4.76 | 4.897 | 5.887 | 5.563 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a flexible polyurethane foam having a density of less than 8 pcf, comprising:
   (I) reacting
   (1) an aromatic polyisocyanate component having a functionality of at least about 2.0;
   (2) from about 90 to about 99.8 parts, based on 100 parts by weight of (2) and (3), of an isocyanate-reactive component comprising one or more polyoxyalkylene polyether polyols having from 2 to 8 hydroxyl groups, an OH number of about 11 to about 280 and containing less than or equal to 25% by weight of copolymerized oxyethylene, based on 100% by weight oxyalkylene;
   (3) from about 0.2 to about 10 parts, based on 100 parts by weight of (2) and (3), of a foam modifier comprising
      (a) from about 35 to about 80% by weight, based on the total weight of component (3), of at least one low molecular weight compound selected from the group consisting of 1,3-propanediol, 1,3-butanediol and 1,4-butanediol,
      and
      (b) from about 20 to about 65% by weight, based on the total weight of component (3), of one or more polyether polyols having from 2 to 8 hydroxyl groups, an OH number of from about 11 to about 280 and having greater than 50% by weight, based on 100% by weight of oxyalkylene, of copolymerized oxyethylene;
   in the presence of:
   (4) one or more blowing agents;
   (5) one or more catalysts;
      and
   (6) one or more surfactants;
   wherein the Isocyanate index is at least about 98.

2. The process of claim 1, in which component (3)(b) has a functionality of less than about 3.8.

3. The process of claim 1, in which component (3)(b) has a functionality of less than about 3.8 and a molecular weight less than 5000.

4. The process of claim 1, in which from about 95% to about 99.7% by weight of component (2) is present, and from about 0.3 to about 5% by weight of component (3) is present.

5. The process of claim 1, wherein the Isocyanate index ranges from about 100 to about 120.

6. The process of claim 1, wherein (1) said aromatic polyisocyanate is selected from the group consisting of 2,4-toluene diisocyanate, 2,6-toluene diisocyanate, 2,2'-diphenylmethane diisocyanate, 2,4'-diphenylmethane diisocyanate, 4,4'-diphenylmethane diisocyanate, polyphenylmethylene polyisocyanates and mixtures thereof.

7. The process of claim 1, in which component (3) said foam modifier comprises (a) 40 to 65% by weight of said low molecular weight component, and (b) from about 35 to 60% by weight of said polyether polyol component.

8. The process of claim 1, in which component (3) said foam modifier additionally comprises (c) dipropylene glycol.

9. The process of claim 8, wherein (3) said foam modifier comprises:
   (a) from 35 to 75% by weight, based on the total weight of component (3), of at least one low molecular weight compound selected from the group consisting of 1,3-propanediol, 1,3-butanediol and 1,4-butanediol;
   (b) from 20 to 60% by weight, based on the total weight of component (3), of one or more polyether polyols containing from 2 to 8 hydroxyl groups per molecule, having an OH number of from about 11 to about 280, and containing greater than 50% by weight, based on 100% by weight of oxyalkylene, of copolymerized oxyethylene; and
   (c) from 5 to 25% by weight, based on the total weight of component (3), of dipropylene glycol.

10. A flexible polyurethane foam having a density of less than 8 pcf, comprising the reaction product of
   (1) an aromatic polyisocyanate component having a functionality of at least about 2.0;
   (2) from about 90 to about 99.8 parts, based on 100 parts by weight of (2) and (3), of an isocyanate-reactive component comprising one or more polyoxyalkylene polyether polyols having from 2 to 8 hydroxyl groups, an OH number of from about 11 to about 280 and containing less than or equal to 25% by weight of copolymerized oxyethylene, based on 100% by weight of oxyalkylene;
   (3) from about 0.2 to about 10 parts, based on 100 parts by weight of (2) and (3), of a foam modifier comprising
      (a) from about 35 to about 80% by weight, based on the total weight of component (3), of at least one low molecular weight compound selected from the group consisting of 1,3-propanediol, 1,3-butanediol and 1,4-butanediol, and
      (b) from about 20 to about 65% by weight, based on the total weight of component (3), of one or more polyether polyols having from 2 to 8 hydroxyl group, an equivalent weight of 200 to 5,000 and having greater than 50% by weight of copolymerized oxyethylene, based on 100% by weight of oxyalkylene;
   in the presence of:
   (4) one or more blowing agents;
   (5) one or more catalysts; and
   (6) one or more surfactants;
   wherein the Isocyanate index is at least about 98.

11. The foam of claim 10, in which component (3)(b) has a functionality of less than about 3.8.

12. The foam of claim 10, in which component (3)(b) has a functionality of less than about 3.8 and a molecular weight less than 5000.

13. The foam of claim 10, in which from about 95% to about 99.7% by weight of component (2) is present, and from about 0.3 to about 5% by weight of component (3) is present.

14. The foam of claim 10, wherein the Isocyanate index ranges from about 100 to about 120.

15. The foam of claim 10 in which (1) said aromatic polyisocyanate is selected from the group consisting of 2,4-toluene diisocyanate, 2,6-toluene diisocyanate, 2,2'-diphenylmethane diisocyanate, 2,4'-diphenylmethane diisocyanate, 4,4'-diphenylmethane diisocyanate, polyphenylmethylene polyisocyanates and mixtures thereof.

16. The foam of claim 10, in which component (3) said foam modifier comprises (a) from about 40 to 65% by weight of said low molecular weight component, and (b) from about 35 to 60% by weight of said polyether polyol component.

17. The foam of claim 10, in which component (3) said foam modifier additionally comprises (c) dipropylene glycol.

18. The foam of claim 17, wherein (3) said foam modifier comprises:
   (a) from 35 to 75% by weight, based on the total weight of component (3), of at least one low molecular weight compound selected from the group consisting of 1,3-propanediol, 1,3-butanediol and 1,4-butanediol;
   (b) from 20 to 60% by weight, based on the total weight of component (3), of one or more polyether polyols containing from 2 to 8 hydroxyl groups per molecule, having an OH number of from about 11 to about 280, and containing greater than 50% by weight, based on 100% by weight of oxyalkylene, of copolymerized oxyethylene; and
   (c) from 5 to 25% by weight, based on the total weight of component (3), of dipropylene glycol.

19. The process of claim 1, wherein (2) said isocyanate-reactive component comprises one or more polyoxyalkylene polyether polyols have from 2 to 6 hydroxyl groups, an OH number of about 20 to about 250 and contain less than or equal to 17% by weight of copolymerized oxyethylene, based on 100% by weight of oxyalkylene.

20. The foam of claim 10, wherein (2) said isocyanate-reactive component comprises one or more polyoxyalkylene polyether polyols have from 2 to 6 hydroxyl groups, an OH number of about 20 to about 250 and contain less than or equal to 17% by weight of copolymerized oxyethylene, based on 100% by weight of oxyalkylene.

* * * * *